(12) United States Patent
Sung et al.

(10) Patent No.: US 6,253,489 B1
(45) Date of Patent: Jul. 3, 2001

(54) LIGHTED FLOWER POT

(75) Inventors: Dean Sung, Dallas; John M. Walker, Grapevine, both of TX (US)

(73) Assignee: Beckett Corporation, Irving, TX (US)

( * ) Notice: Subject to any disclaimer, the term of this patent is extended or adjusted under 35 U.S.C. 154(b) by 0 days.

(21) Appl. No.: 09/374,342

(22) Filed: Aug. 13, 1999

(51) Int. Cl.[7] ............................................. A01G 9/02
(52) U.S. Cl. .......................... 47/65.7; 362/122; 362/154
(58) Field of Search ................................. 47/60, 61, 66.6; 119/246, 253, 266, 267; 362/122, 154; 428/13

(56) References Cited

U.S. PATENT DOCUMENTS

| | | | |
|---|---|---|---|
| 2,559,313 | * 7/1951 | Nordstrom | 362/154 |
| 4,349,864 | 9/1982 | Smith | 362/122 |
| 4,469,726 | * 9/1984 | Niinivuo | 428/13 |
| 4,646,209 | * 2/1987 | Jansen | 362/122 |
| 4,758,934 | 7/1988 | von Kohorn | 362/145 |
| 4,812,952 | 3/1989 | Clemens | 362/84 |
| 5,353,546 | * 10/1994 | Bock | 47/66.6 |
| 5,426,573 | * 6/1995 | Jenkins | 362/154 |
| 5,741,061 | 4/1998 | Lehmann et al. | 362/154 |
| 5,879,071 | 3/1999 | Sanford, Jr. | 362/154 |

FOREIGN PATENT DOCUMENTS

892522 * 7/1982 (BE) ..................................... 362/122

* cited by examiner

Primary Examiner—Charles T. Jordan
Assistant Examiner—Francis T. Palo
(74) Attorney, Agent, or Firm—Daniel J. Chalker; Sanford E. Warren, Jr.; Gardere Wynn Sewell

(57) ABSTRACT

A number of embodiments of flower pots are disclosed. The pots include a transparent or translucent panel or cylindrical portion which exhibit a pattern when one or more light sources are provided behind the panels or cylindrical portions.

10 Claims, 3 Drawing Sheets

LIGHTED FLOWER POT

BACKGROUND OF THE INVENTION

There is an ongoing need to provide attractive containers for plants and flowers and to provide pleasing designs and to enhance the attraction of the plant and flower containers during low light conditions and after dusk.

SUMMARY OF THE INVENTION

In accordance with one aspect of the present invention, an apparatus is provided for containing an object. The apparatus includes an opaque wall to support the object, a transparent or translucent portion spaced from the opaque wall and at least one light source positioned between the opaque wall and the portion. The apparatus can be a planter or a pot. The portion can have a design and may have a translucent portion and an opaque portion. The portion can have a raised pattern. The apparatus is preferably either injection molded, rotationally molded, blow molded or made of a polyresin and fiberglass lay up. The apparatus can be a cube or cylindrical in configuration.

DETAILED DESCRIPTION OF THE INVENTION

Figure 1:
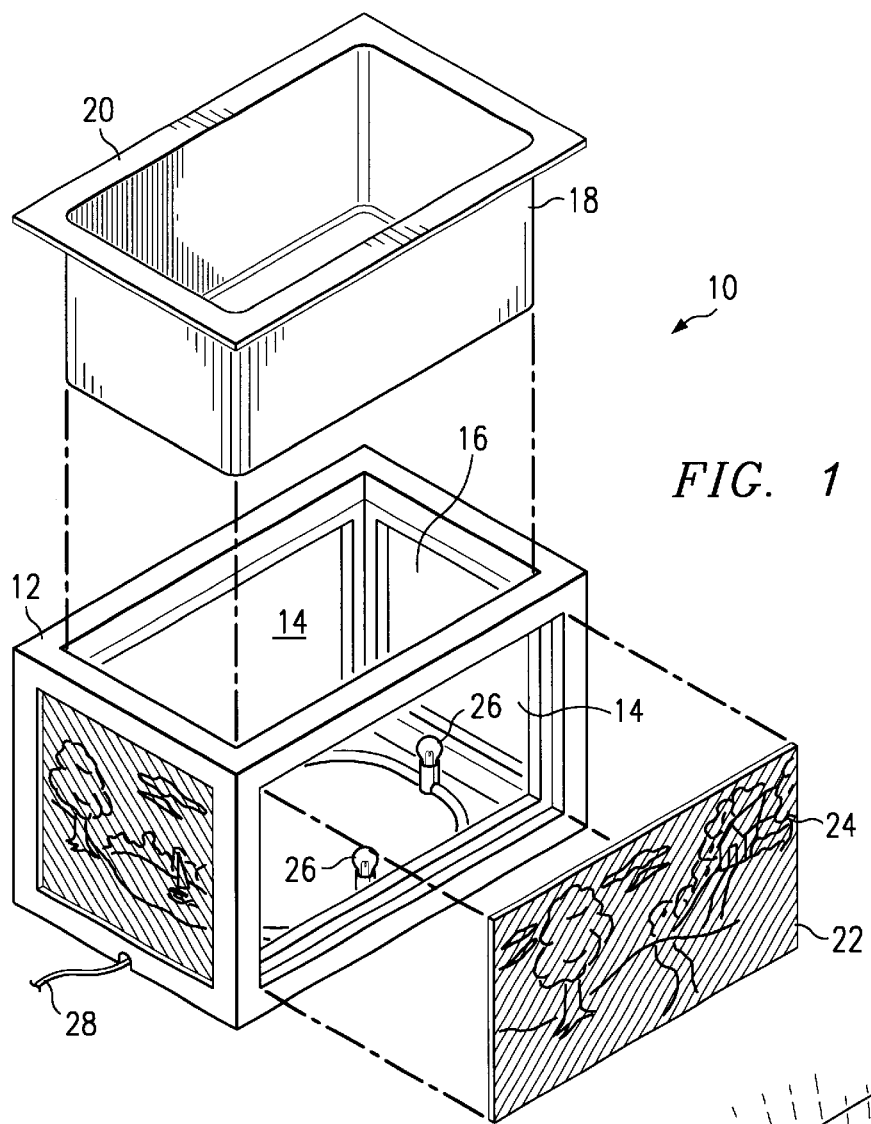
FIG. 1 is an exploded perspective view of an apparatus forming a first embodiment of the present invention.

With reference to FIG. 1, a flower pot 10 defines an apparatus which forms the first embodiment of the present invention. The flower pot 10 includes a rigid frame 12 forming a cube with open sides 14 and top 16. A container 18 fits through the top 16 and is supported on the frame 12 by edges 20 of the container. Container 18 is usually opaque. The container 18 is designed to contain earth for a plant, flower and the like. A series of panels 22 are mounted to the frame 12 over the open sides 14. The panels are preferably transparent or translucent and can have a design 24 thereon. Within the interior of the frame 12 are mounted one or more light sources 26, preferably low wattage 12 volt bulbs. For example, four bulbs at 10 watts each. A power cord 28 extends from the light sources 26 to a power source, such as a wall socket, to power the light sources 26.

As can be readily envisioned, when the light sources 26 are lit, the light will pass through the transparent or translucent panels 22, highlighting any design 24 formed thereon. The design 24 can be a raised pattern, a pattern formed by portions of the panel being opaque and portions being transparent or translucent, formed in the material of the panel 22, painted on the panels or any other suitable mechanism.

As can be appreciated, the use of the light sources 26 will provide a pleasing aesthetic appearance or accent to a room, landscaping or the plant or flower held within the container 18. The light sources 26 can also be used to provide illumination indoors, or an outdoor walkway in the evening, for example. While the container 18 will normally hold a plant or flower, the container can be used to hold any attractive feature, for example a rock garden and the like.

Figure 2:
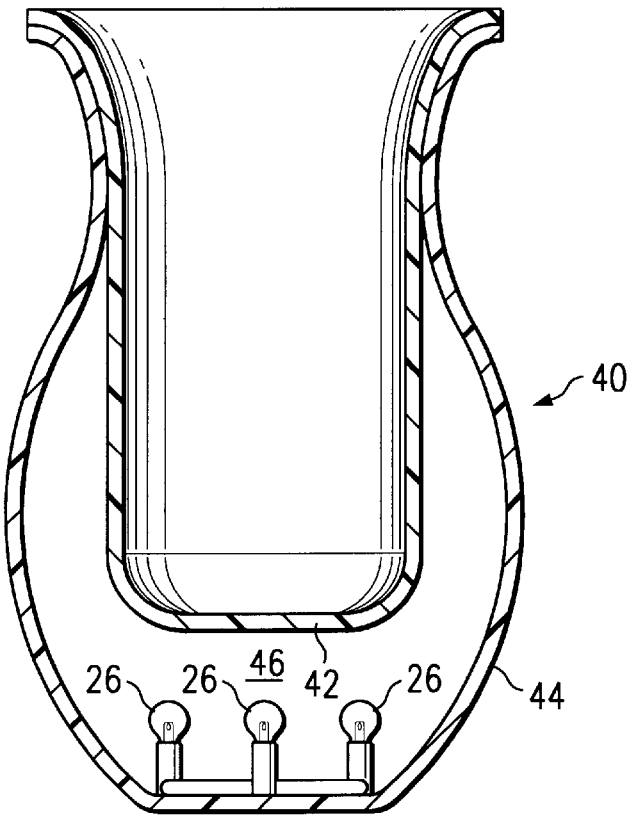
FIG. 2 is a vertical cross section of an apparatus forming a second embodiment of the present invention.

With reference to FIG. 2, a flower pot 40 forming a second embodiment of the invention will be described. The flower pot 40 is formed with an interior container 42 and an outer cylindrical portion 44. A plurality of light sources 26 are mounted within the interior 46 between the portion 44 and container 42. Again, the outer cylindrical portion 44 can be transparent or translucent. Interior container 42 is usually opaque. The cylindrical portion 44 can have designs or patterns 24 thereon in the same variety as described above for panels 22. Being a single component, the flower pot 40 can be injection molded, rotationally molded, blow molded, or formed of a polyresin and fiberglass lay up. Preferably, the interior container 42 and outer cylindrical portion 44 are separately formed so that the light sources can be installed and the interior container 42 can be removed and reinserted within the cylindrical portion 44 as needed to repot a plant and so forth.

Figure 3:
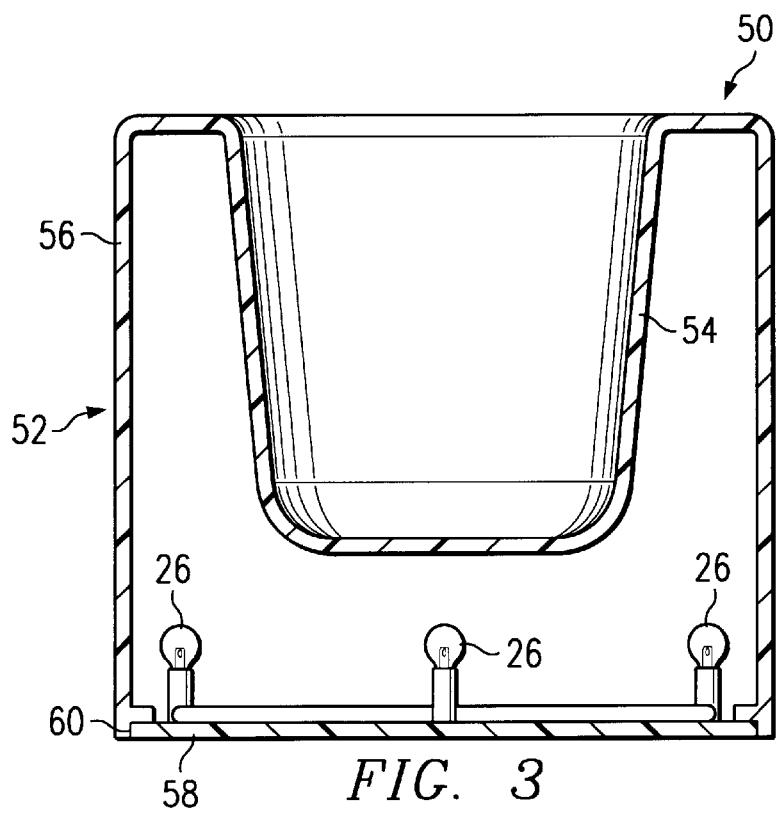
FIG. 3 is a vertical cross section of an apparatus forming a third embodiment of the present invention.

A flower pot 50 is illustrated in FIG. 3. Flower pot 50 is formed of a single molded piece 52 which defines both the container 54 and the outer cylindrical portion 56. A separate base 58 is secured at the bottom edge 60 of the outer cylindrical portion 56. A plurality of light sources 26 are mounted on the base 58, as illustrated. As with flower pot 10 and flower pot 40, the outer cylindrical portion 56 can be provided with designs or patterns 24. Also, the piece 52 can be injection molded, rotationally molded, blow molded, or a polyresin and fiberglass lay up as flower pot 40.

Figure 4:
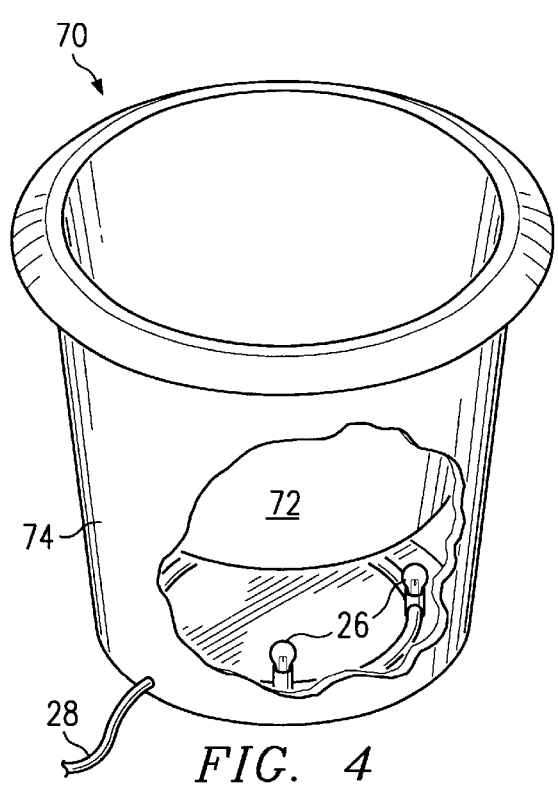
FIG. 4 is a perspective view, partially cut away, of an apparatus forming a fourth embodiment of the present invention.

A flower pot 70 is illustrated in FIG. 4. The flower pot 70 is formed of an interior container 72 and an outer cylindrical portion 74. Outer cylindrical portion 74 can have design 24, which, for example, could be invisible with the light sources 26 off.

Figure 5:
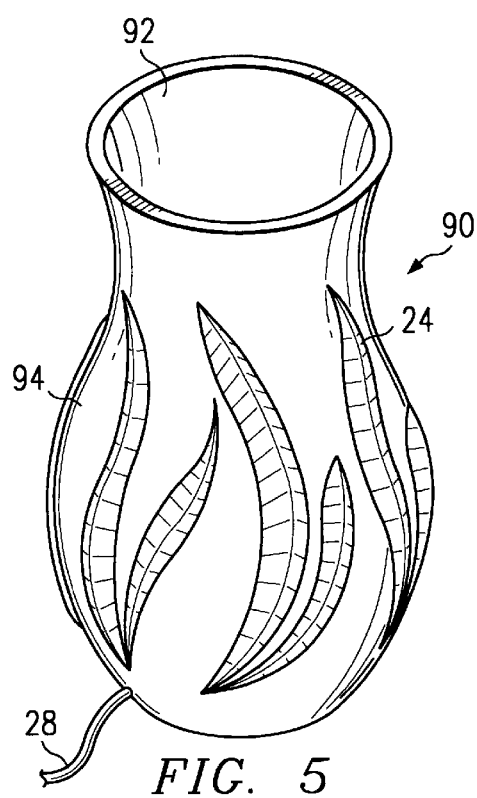
FIG. 5 is a perspective view of an apparatus forming a fifth embodiment of the present invention.
Figure 7:
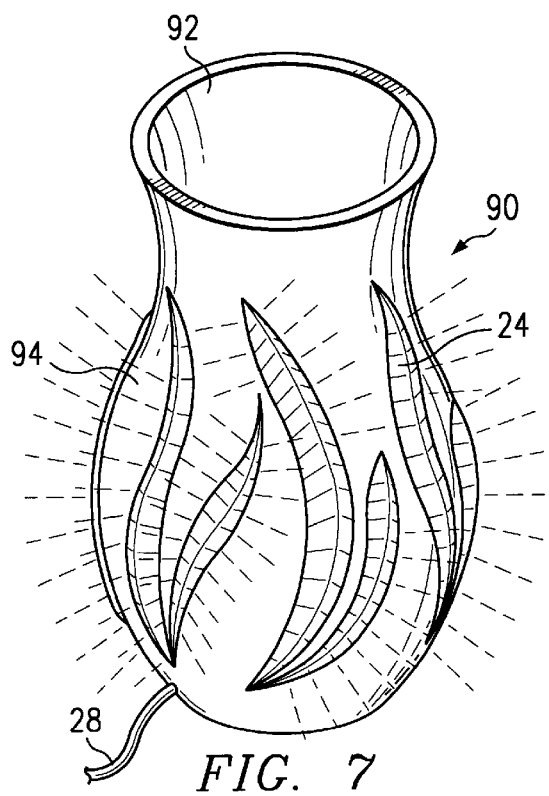
FIG. 7 is a perspective view of the apparatus of the fifth embodiment lighted.

With reference to FIG. 5 and FIG. 7, a flower pot 90 forming a fifth is embodiment of the present invention is illustrated. As with the other embodiments above, the flower pot 90 has an inner cylindrical container 92 and an outer cylindrical portion 94. The outer cylindrical portion 94 can have a design or pattern 24 such as described in the embodiments above. FIG. 7 is intended to illustrate the effect when the light sources 26 are lit.

Figure 6:
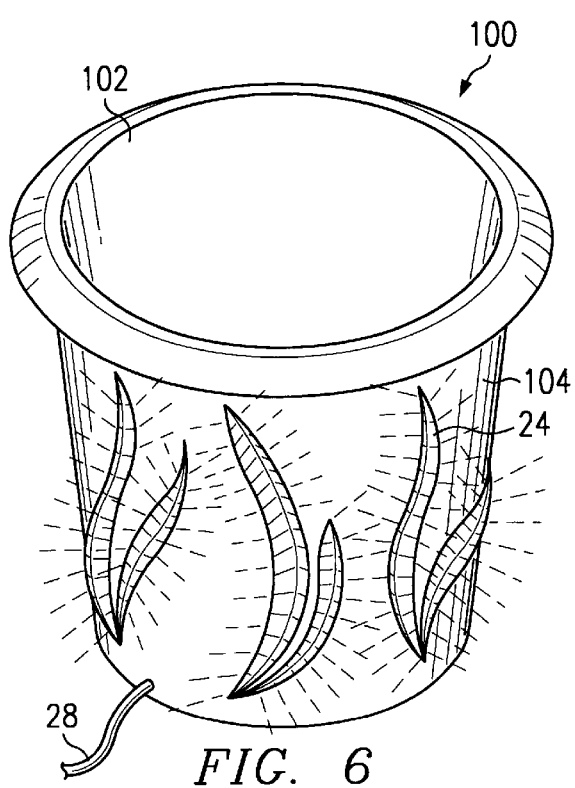
FIG. 6 is a perspective view of a sixth embodiment of the present invention.

With reference to FIG. 6, a flower pot 100 forming a sixth embodiment of the present invention is illustrated. Again, the flower pot 100 has an interior container 102 and an outer cylindrical portion 104 with a design or FIG. 24 thereon.

Figure 8:
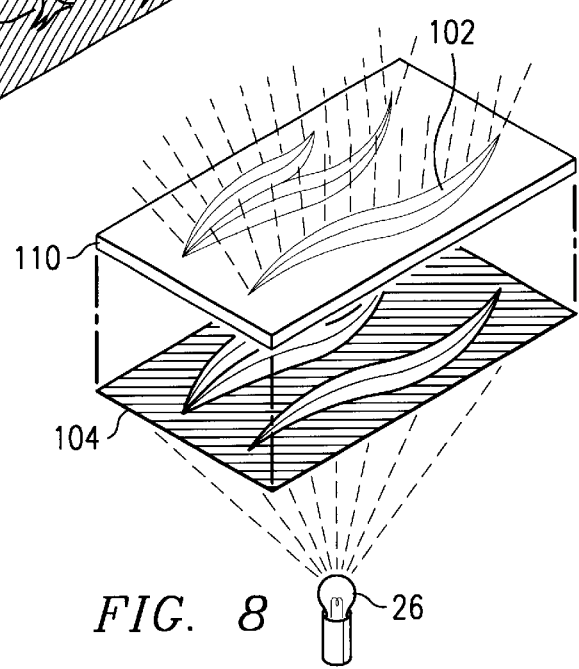
FIG. 8 is an illustrative view of the lighting of the apparatus of the present invention.

FIG. 8 illustrates one technique for providing a pattern or symbol on a panel or outer cylindrical portion. A layer 110 of transparent or translucent material is provided with a pattern 102 formed therein. The transparent or translucent layer 110 is backed up by a mask or opaque paint layer 104. The light source 26 shines through the layer 104 and transparent or translucent layer 110.

The light sources 26 can be powered by any suitable mechanism. For example, the light sources can be powered by 120 volt AC line voltage, 12 volt AC power source, or solar cells. The design or pattern on the panels or outer cylindrical portions can be formed in many different ways. For example, the thickness of the material forming the panels or outer cylindrical portions can be varied so that it is thinner in some spots than others which provide contrast. The material of which the panels and cylindrical portions are made can itself be a marbled or mottled material to provide contrast. Paint can be applied to the inner surface of the panels and outer cylindrical portions. The pattern can be done in relief or raised. The panels and outer cylindrical portions can be painted with an opaque paint which does not show up without the lighting provided by the light sources 26. Therefore, the flower pot will look unadorned when the light sources are unlit, but will show a distinct pattern when the light sources come on.

While certain embodiments of the apparatus of the present invention have been presented, it is appreciated that the invention is not limited thereto. Many variations, substitutions and amendments can be made to these embodiments without departing from the scope of the invention. Such variations, substitutions and amendments as would be apparent to one having ordinary skill in the art who would be familiar with the teachings disclosed herein are also deemed to fall within the scope and spirit of the present invention as hereinafter claimed.

We claim:

1. An apparatus for containing an object, comprising:

an opaque wall to support the object;

a transparent or translucent portion spaced from the opaque wall and having a pattern formed thereon; and at least one light source positioned between the opaque wall and the portion to illuminate the portion and the pattern.

2. The apparatus of claim 1 wherein the object is a plant or flower.

3. The apparatus of claim 1 wherein the transparent or translucent portion is a panel.

4. The apparatus of claim 1 wherein the portion has a pattern formed thereon.

5. The apparatus of claim 4 wherein the pattern is a raised pattern.

6. The apparatus of claim 4 wherein the pattern is formed by the portion having a translucent portion and an opaque portion.

7. The apparatus of claim 1 wherein the opaque wall and transparent or translucent portion are molded.

8. The apparatus of claim 1 further comprising a frame, the transparent or translucent portion forming a panel mounted to the frame.

9. The apparatus of claim 1 wherein the transparent or translucent portion is a cylinder.

10. The apparatus of claim 1 wherein the apparatus is a flower pot.

* * * * *